United States Patent [19]

Gorman et al.

[11] Patent Number: 4,842,393

[45] Date of Patent: Jun. 27, 1989

[54] CUSPATED LENS

[75] Inventors: Michael A. Gorman; Mark H. Sterling; Robert M. Kiehn; Lowell T. Wood, all of Houston, Tex.

[73] Assignee: University of Houston-University Park, Houston, Tex.

[21] Appl. No.: 71,493

[22] Filed: Jul. 9, 1987

[51] Int. Cl.[4] ............................................. G02B 13/18
[52] U.S. Cl. ..................................... 350/432; 350/440
[58] Field of Search ................ 350/440, 432, 433, 434, 350/435

[56] References Cited

U.S. PATENT DOCUMENTS

| | | | |
|---|---|---|---|
| 2,101,016 | 12/1937 | Beach | 350/432 |
| 2,405,989 | 8/1946 | Beach | 350/432 |
| 2,458,401 | 1/1949 | Moore | 350/432 |
| 2,759,393 | 8/1956 | McLeod | 350/432 X |
| 3,419,321 | 12/1968 | Barber | 350/432 |
| 3,547,526 | 12/1970 | Devereux | 350/432 |
| 3,848,970 | 11/1974 | Goodell | 350/432 |
| 3,932,023 | 1/1976 | Humer | 350/96.18 |
| 4,099,848 | 7/1978 | Osakabe | 350/432 |
| 4,128,302 | 12/1978 | DiVita | 350/96.18 |
| 4,181,439 | 1/1980 | Tresch | 350/432 |
| 4,621,907 | 11/1986 | Clegg | 350/432 |
| 4,637,691 | 1/1987 | Uehara et al. | 350/432 |
| 4,641,915 | 2/1987 | Asakawa | 350/96.18 |

FOREIGN PATENT DOCUMENTS 2431265  1/1975  Fed. Rep. of Germany ...... 350/432

OTHER PUBLICATIONS

J. B. Goodell, Eccentric Lenses for Producing Ring Images, Dec. 1969, p. 2566, Applied Optics.
John H. McCleod, the Axicon: a New Type of Optical Element, submitted Sep. 10, 1053, p. 592, Journal of Optical Society of America.

Primary Examiner—John K. Corbin
Assistant Examiner—Scott J. Sugarman
Attorney, Agent, or Firm—Pravel, Gambrell, Hewitt, Kimball & Krieger

[57] ABSTRACT

A cuspate lens is disclosed having a slope magnitude which decreases from a maximum at a central cusp to a minimum at the periphery. A radially symmetric version of the lens can focus light into a ring, or produce an annular beam. Also disclosed are a fiber optic coupler and an optical slip ring using the cuspated lenses.

14 Claims, 4 Drawing Sheets

EFFECT OF PARALLEL SURFACES

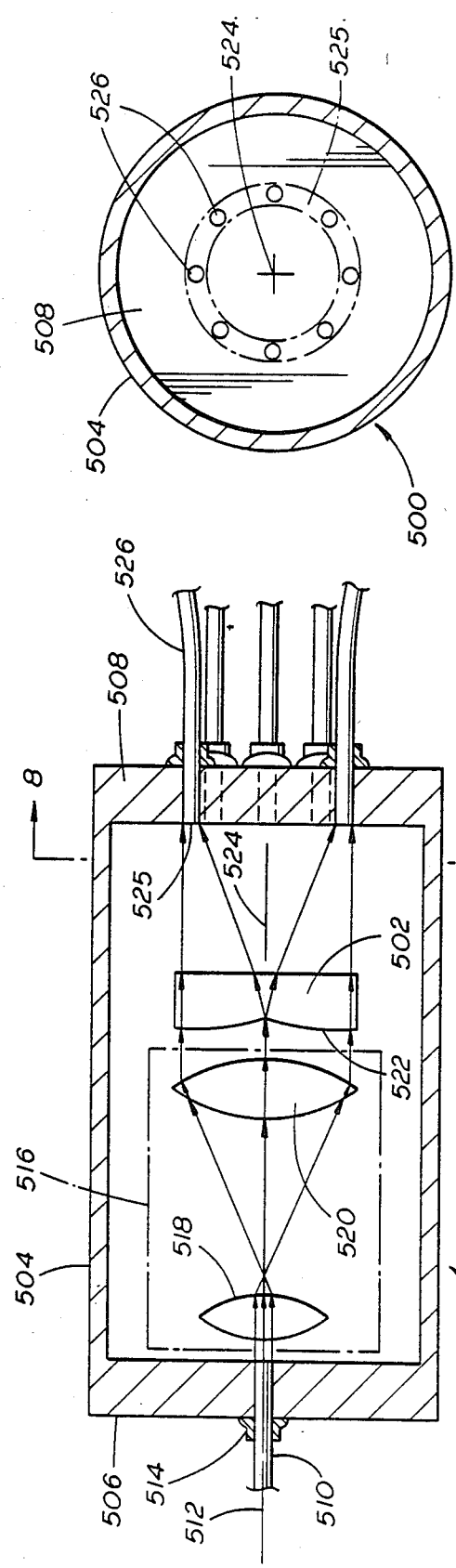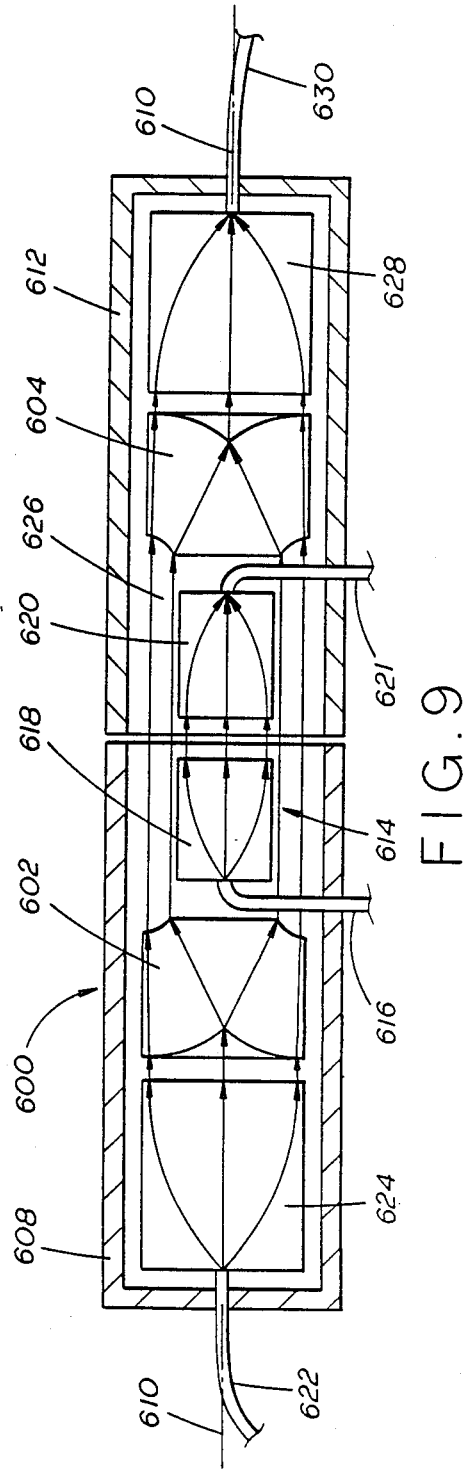

CUSPATED LENS

The invention described herein was made in the course of, or under a contract with the Office of Naval Research, and the Government has certain rights in the invention.

FIELD OF THE INVENTION

This invention relates to a cuspate refractive device having a maximum slope magnitude inside the periphery of the device which decreases toward the periphery, and particularly to a cuspate lens which focuses radiation into a ring or which produces an annular beam of parallel radiation. The invention also relates to a fiber optic coupler and an optical slip ring employing such a cuspate lens.

BACKGROUND OF THE INVENTION

Laser cutting in which a high intensity beam of radiation is employed to cut an object is well known. Such techniques are widely employed, for example, in surgical techniques. Such laser cutting heretofore has suffered from drawbacks in that, to cut the object at more than the entry or focusing point of the laser beam, it has been necessary to move either the object or the laser beam generating source to trace the desired path of the cut in the object. This is particularly disadvantageous when using powerful laser sources which are typically large, heavy and fragile or otherwise sensitive to movement, and/or when the object to be cut is also large and/or heavy. Further, such cutting is not instantaneous because of the time it takes to effect the movement of the laser and/or object being cut. Thus, there is a need, heretofore unfilled as far as Applicants are aware, for a device to permit the desired laser cutting instantaneously without having to move the laser source or the object to be cut.

Couplers for optical fibers in which light is transmitted between one optical fiber and one or more other optical fibers are also well known. However, such optic couplers heretofore known have suffered from a drawback in that it has been necessary to fuse the fibers together. Once the fibers are fused, it is difficult to take them apart. Also, it has been difficult to ensure that each fiber receives the same fraction of the incident light. Thus, there is a need for an optical coupler in which it is not necessary to fuse the optical fibers and in which each fiber receives the same fraction of incident light.

SUMMARY OF THE INVENTION

The present invention provides a refractive device for transmitting radiation in a selected geometric pattern, such as, for example, a ring or a line, or a plurality of rings or lines. The device includes a central longitudinal axis and a periphery in spaced relation thereto. A front surface extends laterally from the axis to the periphery for receiving radiation oriented parallel with respect to the axis. The front surface has a cusp at least at the axis, and a maximum slope magnitude inside the periphery and a slope magnitude which decreases from the cusp toward the periphery for refracting radiation away from the axis. A rear surface transmits the refracted radiation from the device.

In another aspect, there is provided a lens for focusing radiation into a ring at a focal plane. The lens includes a central longitudinal axis and a periphery in spaced relation thereto. A front surface which is radially symmetric with respect to the axis extends laterally therefrom to the periphery for receiving radiation oriented parallel with respect to the axis. The front surface has a cusp at the axis, a maximum slope magnitude at the cusp, a decreasing slope magnitude from the cusp to the periphery and a geometry for focusing the radiation at a focal plane away from an area bounded by a circle concentric with the axis and into a ring around the circle. The lens has a rear surface for transmitting the radiation therefrom. The focal plane may be disposed in front of or behind the rear surface.

In still another aspect, there is provided a lens for producing an annular beam of radiation. The lens includes a central longitudinal axis and a periphery in spaced relation thereto. A front surface which is radially symmetric with respect to the axis extends laterally therefrom to the periphery for receiving radiation oriented parallel with respect to the axis. The front surface has a cusp at the axis, a maximum slope magnitude at the cusp, a decreasing slope magnitude from the cusp to the periphery and a geometry for refracting the radiation away from the axis. The lens has a rear surface with a geometry for orienting the refracted radiation parallel with respect to the axis and transmitting the radiation from the lens in an annular beam.

A further aspect of the invention provides a lens made of a transmissive material for conservatively focusing radiation at a focal plane into a ring around a central area from which the focused radiation is excluded. The lens includes a central longitudinal axis and a periphery in spaced relation thereto. The lens has a front surface extending laterally from the axis to the periphery for receiving radiation oriented parallel with respect to the axis. The front surface is radially symmetric with respect to the axis, and has a cusp and a maximum slope magnitude at the axis. The slope magnitude decreases from the cusp to a minimum at the periphery for refracting the radiation away from the axis. The lens has a flat rear surface normal to the axis for transmitting the refracted radiation from the lens. The front surface has a functional profile essentially according to the equation:

$$f(r) = [OPL - t - D\sec\xi]/[n\sec\gamma - 1],$$

wherein f(r) is the functional form of the front surface, r is the radial distance from the axis, t is the thickness of the lens from the rear surface to the front surface at its periphery, D is the focal distance from the rear surface to the focal plane, n is the refractive index of the lens, $\gamma$ is an angle according to the equation:

$$\gamma = \tan^{-1}[f'(r)] - \sin^{-1}\{[\sin(\tan^{-1}[f'(r)])]/n\},$$

wherein f'(r) is the first derivative of f(r) with respect to r, $\xi$ is an angle according to the equation $$\xi = \sin^{-1}(n \sin \gamma),$$

and OPL is the optical path length according to the equation:

$$OPL = [t - f(r)] + n[f(r)/\cos \gamma] + [D/\cos \xi].$$

A still further aspect of the invention provides an optical fiber coupler including means for receiving a transmissive end of a first optical fiber, means for receiving transmissive ends of a plurality of second optical fibers in a circular arrangement and defining a ring with a radial width corresponding to a transverse dimension of the second optical fibers, and means including a cuspate lens for conservatively transmitting light between the end of the first optical fiber and the ring.

The cuspate lens of the invention is also useful in an optical slip ring having at least two channels. The slip ring includes first and second opposed housings rotatable with respect to each other about a common axis. A first channel includes a first channel optical fiber and first channel beam spreader transmissively associated therewith in each housing. The first channel beam spreaders are coaxially aligned with the axis and transmissively opposed in the respective housings. A second channel includes a second channel optical fiber, and a second channel beam spreader and a cuspate lens transmissively associated therewith in each respective housing. The second channel beam spreaders are coaxially aligned with the axis and transmissively disposed between a respective second channel optical fiber and a respective cuspate lens. The lenses each have a cuspate front surface for receiving light from a respective second channel beam spreader and a rear surface for transmitting the received light into an annular beam around the first channel beam spreaders. The rear surfaces of the cuspate lenses are transmissively opposed in their respective housings.

BRIEF DESCRIPTION OF THE DRAWINGS

FIG. 7 is a schematic cross-sectional view of a fiber optic coupler using a lens of the present invention;

FIG. 8 is a plan view of the device of FIG. 7 as seen along the lines 8—8; and

FIG. 9 is a schematic cross-sectional view of a two-channel optic slip ring using a lens of the present invention.

DETAILED DESCRIPTION OF THE INVENTION

Figure 2:
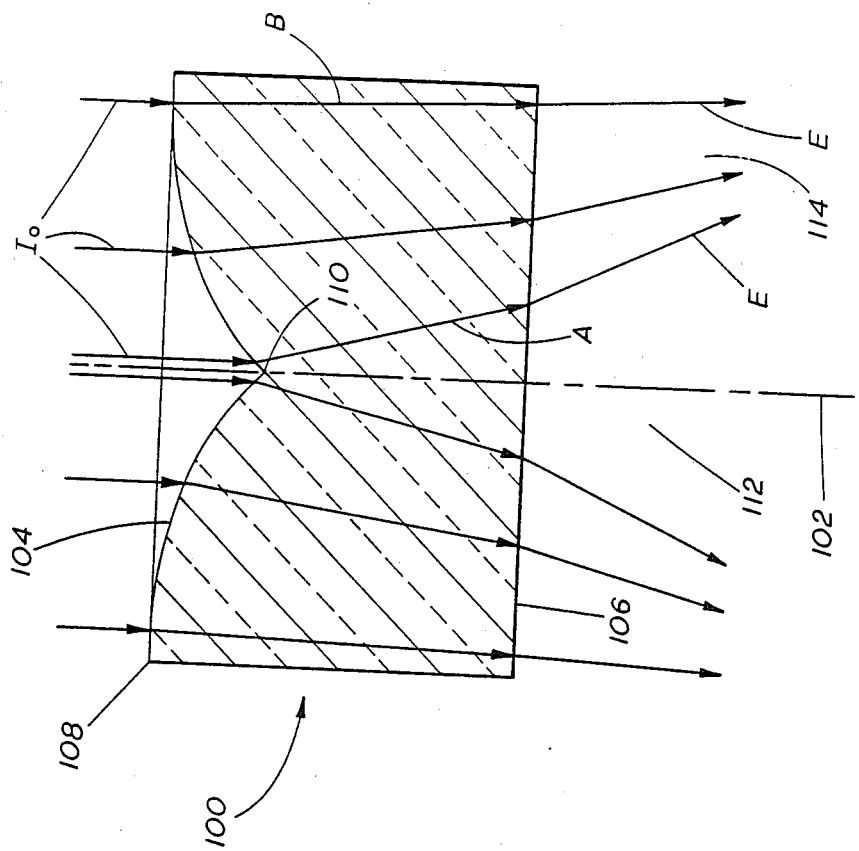
FIG. 2 is a schematic view, partly in cross-section, of the lens of FIG. 1 receiving light from a parallel light source as seen along the lines 2—2.

The refractive device of the present invention is contemplated as being useful for the transmission of one or more types of radiation, such as, for example, gamma rays, X-rays, ultraviolet rays, visible light rays, infrared, microwaves, radio waves, sound and ultrasound waves, and the like. As used herein, the term "radiation" also broadly includes beams of particles, such as, for example, electrons, protons, neutrons, alpha particles and the like. The refractive device is generally made of a material transmissive to the type of radiation desired to be transmitted therethrough. Such materials are known in the art. For convenience, reference is made herein to light and visible light rays for exemplary purposes, but it is to be understood that the refractive device may be suitable for other types of radiation as well, depending on the materials of construction.

As used herein, the term "slope magnitude" is the absolute value of the slope of a lens surface, e.g. the variation of the lens surface dimension taken in a direction parallel to a reference axis or plane with respect to the variation in dimension in a direction normal to the reference. Thus, conventional concave and convex lens surfaces have a slope magnitude of zero at the center which increases to a maximum slope magnitude at their periphery. In contrast, the front surface of the refractive device of the present invention has a maximum slope magnitude inside the area boundary by the periphery, preferably adjacent the cusp, and especially at the cusp, and a slope magnitude which decreases in a direction from the cusp toward the periphery for at least a portion of the distance from the cusp toward the periphery, preferably to a minimum slope magnitude at the periphery, and especially decreasing essentially over the entire distance from the cusp to the periphery.

As used herein, the term "cusp" is used in the sense of a fixed point on a mathematical curve at which a point tracing the curve would essentially reverse its direction of motion, i.e. the sign of the slope changes and is discontinuous at the cusp. The cusp of the front surface of the refractive device is located at least at the longitudinal axis of the device. The cusp may be, for example, a point at the center of a radially symmetric, circular lens, or at the center of an elliptically shaped lens. Alternatively, the cusp may be a straight line in a lens symmetric with respect to a plane passing through the line, or a curve in an asymmetric refractive device.

Preferably, the refractive device is symmetric. For example, the lens may be radially symmetric with respect to the cusp to generally focus light away from the axis passing through the cusp into a ring at a focal plane around a darkened central area. Or, the lens may have an elliptical periphery and be symmetric with respect to an elliptical plane containing the axially aligned cusp to generally focus light at a focal plane, away from an elliptical area into an elliptical ring around the darkened elliptical central area. Alternatively, the device may have a front surface with a linear cusp extending from one peripheral side to an opposite peripheral side and be symmetric with respect to the cusp to focus incident radiation at a focal plane into two parallel lines away from the area between the parallel lines.

In a preferred embodiment, essentially all of the parallel incident light entering the front surface of the refractive device is transmitted through the rear surface. Thus, in contrast to other optical devices in which light is excluded from a central region by blocking transmission with an opaque surface or material, the present device conserves the incident light and focuses or refracts essentially all of the light to the periphery of the area from which the transmitted light is excluded.

Figure 1:
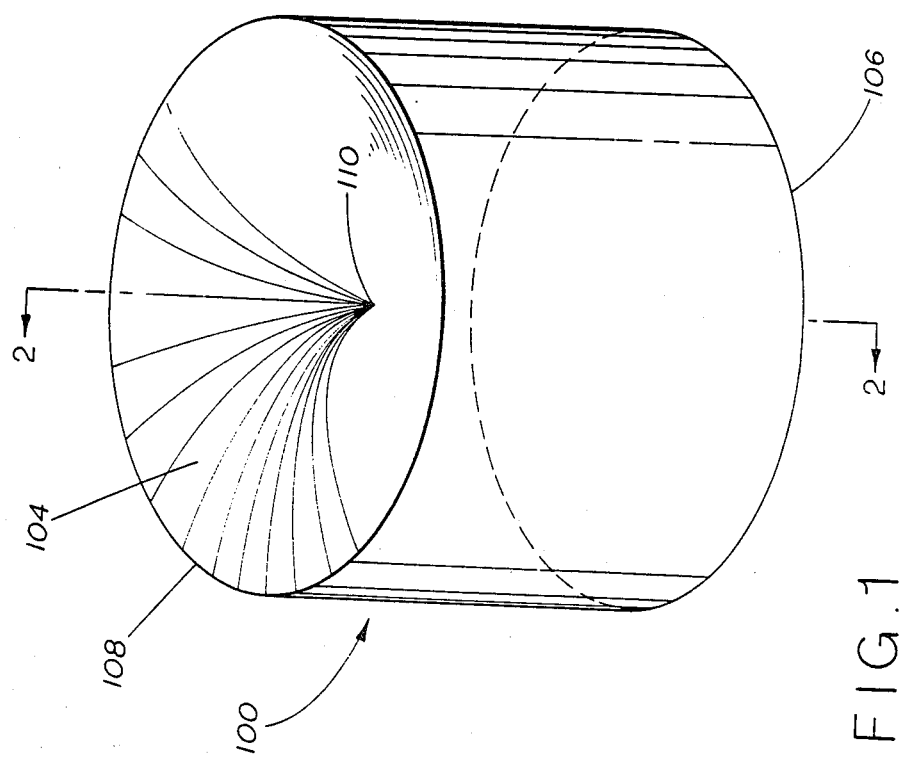
FIG. 1 is a perspective view of a lens according to the present invention.

Referring now to FIGS. 1 and 2, there is shown a refractive device or lens 100 made by conventional lens manufacturing techniques such as lathing or molding of an optically transmissive material such as, for example, glass, polymethylmethacrylate or the like. The lens 100 has a central longitudinal axis 102, a front surface 104, and rear surface 106. The front surface 104 extends laterally from axis 102 toward periphery 108 and is radially symmetric with respect to axis 102. The surface 104 has a cusp 110 at axis 102. The slope magnitude is greatest at the cusp 110 and decreases from the cusp 110 to a minimum at the periphery 108.

In operation, the lens 100 receives incident light $I_0$ oriented parallel with respect to axis 102. The light $I_0$ is bent or refracted at the front surface 104. The path through lens 100 of the light $I_0$ refracted at surface 104 depends on the angle of the surface 104 through which the light $I_0$ is received and the refractive index of the lens material. However, the decreasing slope magnitude of the surface 104 generally refracts the light $I_0$ away from the axis 102. For example, path A followed by the light $I_0$ received at the surface 104 adjacent the cusp 110 is bent more sharply away from the axis 102 than the light $I_0$ received at the surface 104 adjacent the periphery 108 which follows a path B substantially parallel to axis 102. The result is that the light E transmitted through the surface 106 is generally refracted away from the axis 102 producing a darkened central circle 112 from which the light E is generally excluded and a generally bright ring 114. The lens 100 may or may not have a focal plane, depending on the geometry of the front surface 104, the refractive properties of the material of which the lens 100 is made, and the geometry of rear surface 106.

Figure 3:
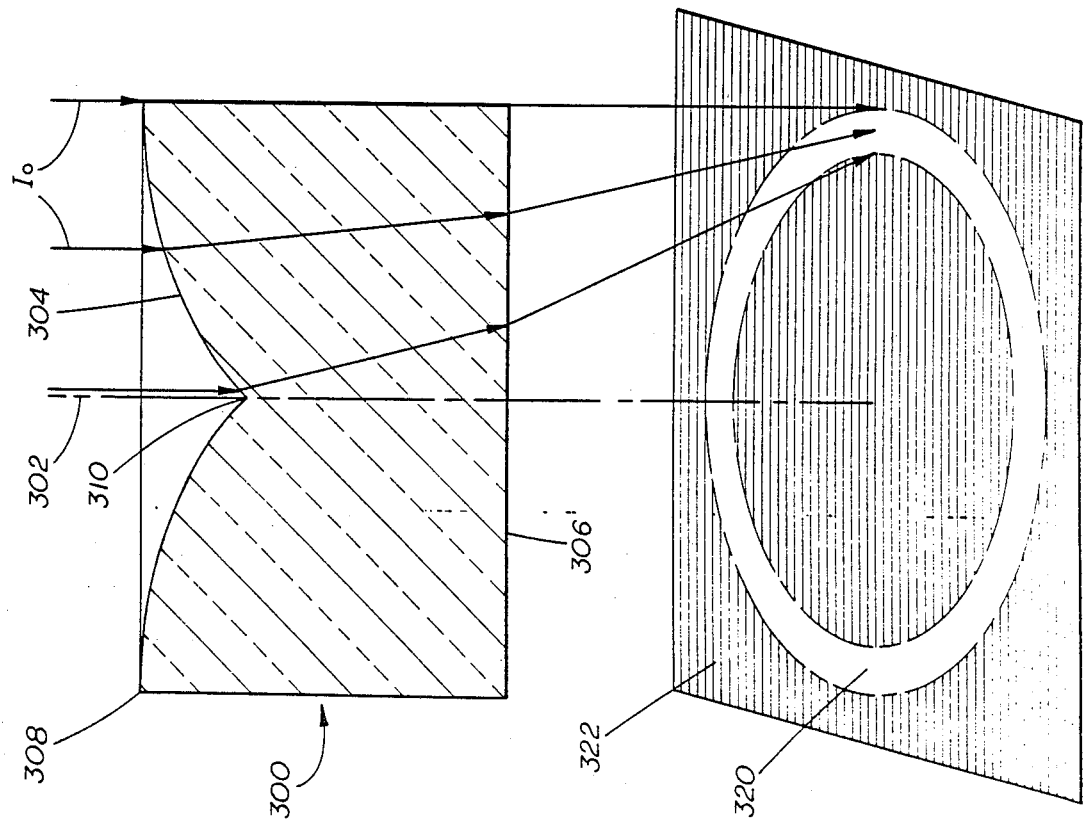
FIG. 3 is a schematic view, partly in cross-section, of a radially symmetric lens with an annular focal plane according to the present invention.

In FIG. 3, there is illustrated a radially symmetric lens 300 having an axis 302, front surface 304, rear surface 306, periphery 308 and cusp 310 essentially as described above with reference to FIGS. 1 and 2. However, taking into account the refractive index of material of lens 300 and the flat geometry of the rear surface 306, the geometry of surface 304 is designed to focus the incident light $I_0$ into ring or annulus 320 at focal plane 322. By altering the geometry of surface 304, the focal plane 322 may be axially disposed as desired.

Figure 5:
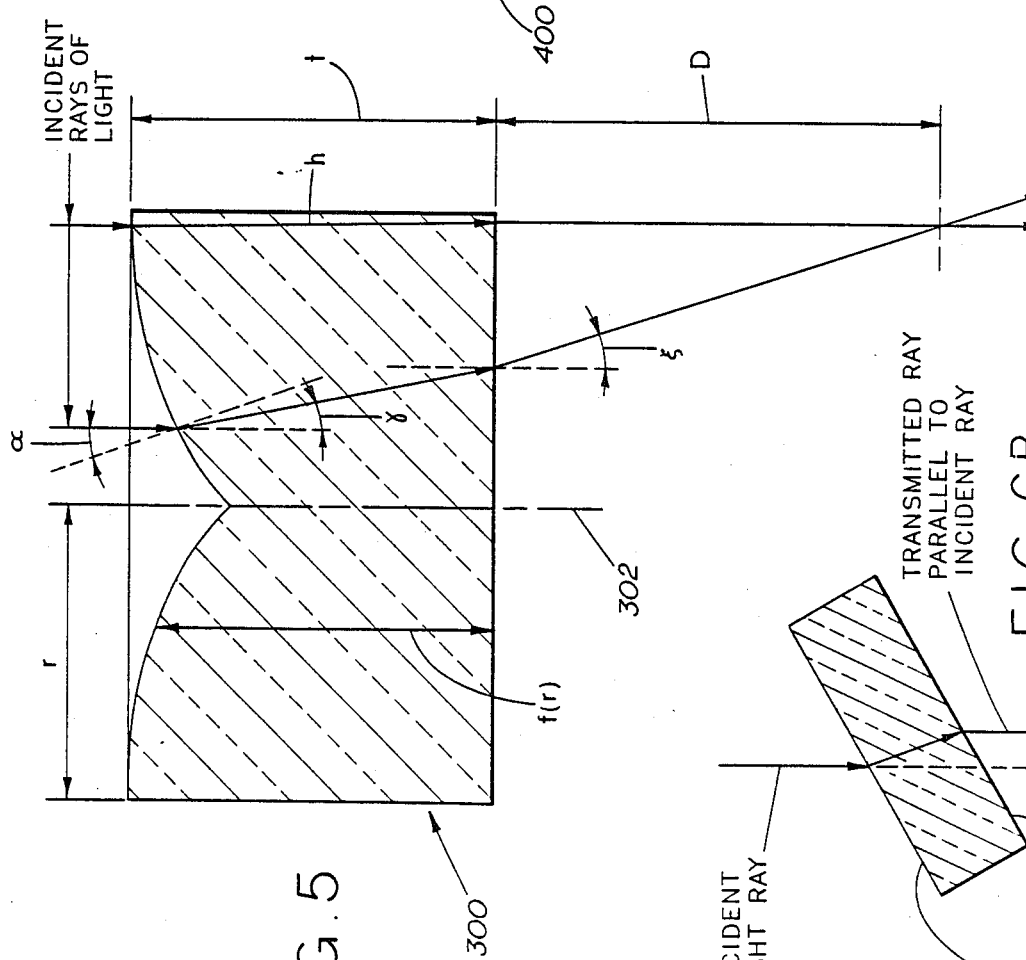
FIG. 5 is a schematic cross-sectional view of the lens of FIG. 3 illustrating variables in the optical path length equation.

Generation of a surface profile for the front surface of a radially symmetric cuspate lens with an annular focal plane, such as the lens illustrated in FIG. 3, is done by solving the optical path length equation therefor:

$$OPL = [t - f(r) + n[f(r)/\tan \gamma] + [D/\tan \xi] \quad (1)$$

wherein, as illustrated in FIG. 5, OPL is the optical path length, t is the thickness of the lens at the periphery, f(r) is the functional form of the surface, n is the refractive index, $\gamma$ is the angle of the path of the ray inside the lens to the lens axis, and $\xi$ is the angle of the transmitted light to the normal of the rear surface. Since $\alpha = \tan^{-1}[f'(r)]$, wherein $f'(r) = df/dr$ and $\alpha$ is the angle between the incident ray and the normal to the lens surface, it can be shown that $$\gamma = \tan^{-1}[f'(r)] - \sin^{-1}\{[\sin(\tan^{-1}[f'(r)])]/n\}; \text{ and}$$

$$\xi = \sin^{-1}(n \sin \gamma).$$

By rearranging equation (1), $$f(r) = [OPL - t - D\cot \xi]/[n\cot \gamma - 1].$$

Equation (4) is difficult to solve mathematically, but its solution can be approximated by numerical methods. An exemplary Fortran computer program for numerically solving equation (4) is as follows:

```
PROGRAM CUSP1
REAL R, DR, F, FP, LF, FF, CF, CF1, ETA, GAMMA, N, T, D
REAL Q, RR, RRR, RAD
WRITE (6,10)
FORMAT (1X, 'RADIUS(mm)=')
READ (5,20) R
FORMAT (F15.7)
WRITE (6,11)
FORMAT (1X, 'STEPSIDE(mm)=')
READ (5,20) DR
WRITE (6,12)
FORMAT (1X, 'THICKNESS(mm)=')
READ (5,20) T
WRITE (6,13)
FORMAT (1X, 'FOCAL DISTANCE(mm)=')
READ (5,20) D
WRITE (6,14)
FORMAT (1X,'n=')
READ (5,20) N
RAD=R
RR=0
FP=0
F=T
RRR=RR+RAD
WRITE (6,15)
FORMAT (1X, '(Coordinates of surface profile referenced to')
WRITE (6,10)
FORMAT (1X, 'an origin on the lens axis at the rear surface.)')
Q=T-F
WRITE (6,17)
FORMAT (1X,' r(mm)    f(r)   (mm)')
WRITE (6,100) RRR, F
FORMAT (F20.2,F13.2)F13.4,F13.4)
R=R-DR
RR=RR-DR
F=F-FP*DR
LF=F
Q=T-LF
RRR=RR+RAD
WRITE (6,100) RRR, LF
R=R-DR
RR=RR-DR
FF=LF
F=LF
LF=F
Q=T-LF
FP=FP+.0001
F=FF-FP*DR
GAMMA=ATAN(FP)-ASIN(SIN(ATAN(FP))/N)
ETA=ASIN(N*SIN(GAMMA))
CF=(N-1.)*T+(1.-1./COS(ETA))*D
CF1=CF/((N/COS(GAMMA))-1.)
IF (CF1-F-.00001) 300,300,200
IF (R) 400,150,150
END
```

Using this CUSP1 PROGRAM, the following data output was generated:
  RADIUS(mm)=20.
  STEPSIZE(mm)=0.5
  THICKNESS(mm)=25.
  FOCAL DISTANCE(mm)=50.
  n=1.49
(Coordinates of surface profile referenced to an origin on the lens surface at the rear axis.)

| r (mm) | f(r) (mm) |
|---|---|
| 20.00 | 25.00 |
| 19.50 | 25.00 |
| 19.00 | 24.98 |
| 18.50 | 24.96 |
| 18.00 | 24.93 |
| 17.50 | 24.88 |
| 17.00 | 24.83 |
| 16.50 | 24.78 |
| 16.00 | 24.71 |
| 15.50 | 24.63 |
| 15.00 | 24.55 |
| 14.50 | 24.46 |
| 14.00 | 24.36 |

| r (mm) | f(r) (mm) |
|---|---|
| 13.50 | 24.25 |
| 13.00 | 24.14 |
| 12.50 | 24.01 |
| 12.00 | 23.88 |
| 11.50 | 23.74 |
| 11.00 | 23.59 |
| 10.50 | 23.43 |
| 10.00 | 23.27 |
| 9.50 | 23.09 |
| 9.00 | 22.91 |
| 8.50 | 22.72 |
| 8.00 | 22.52 |
| 7.50 | 22.31 |
| 7.00 | 22.09 |
| 6.50 | 21.87 |
| 6.00 | 21.63 |
| 5.50 | 21.39 |
| 5.00 | 21.13 |
| 4.50 | 20.87 |
| 4.00 | 20.60 |
| 3.50 | 20.32 |
| 3.00 | 20.03 |
| 2.50 | 19.73 |
| 2.00 | 19.42 |
| 1.50 | 19.10 |
| 1.00 | 18.77 |
| 0.50 | 18.43 |
| 0.00 | 18.08 |

A cuspate lens was fabricated by machining a polymethacrylate block obtained under the trade designation PLEXIGLAS by a computer-aided lathing process to conform to the profile generated by this program. The resulting lens had a radius of 20 mm, a thickness of 25 mm, a focal distance of 50 mm from the rear surface and a focusing ring width of about 1 mm.

Figure 4:
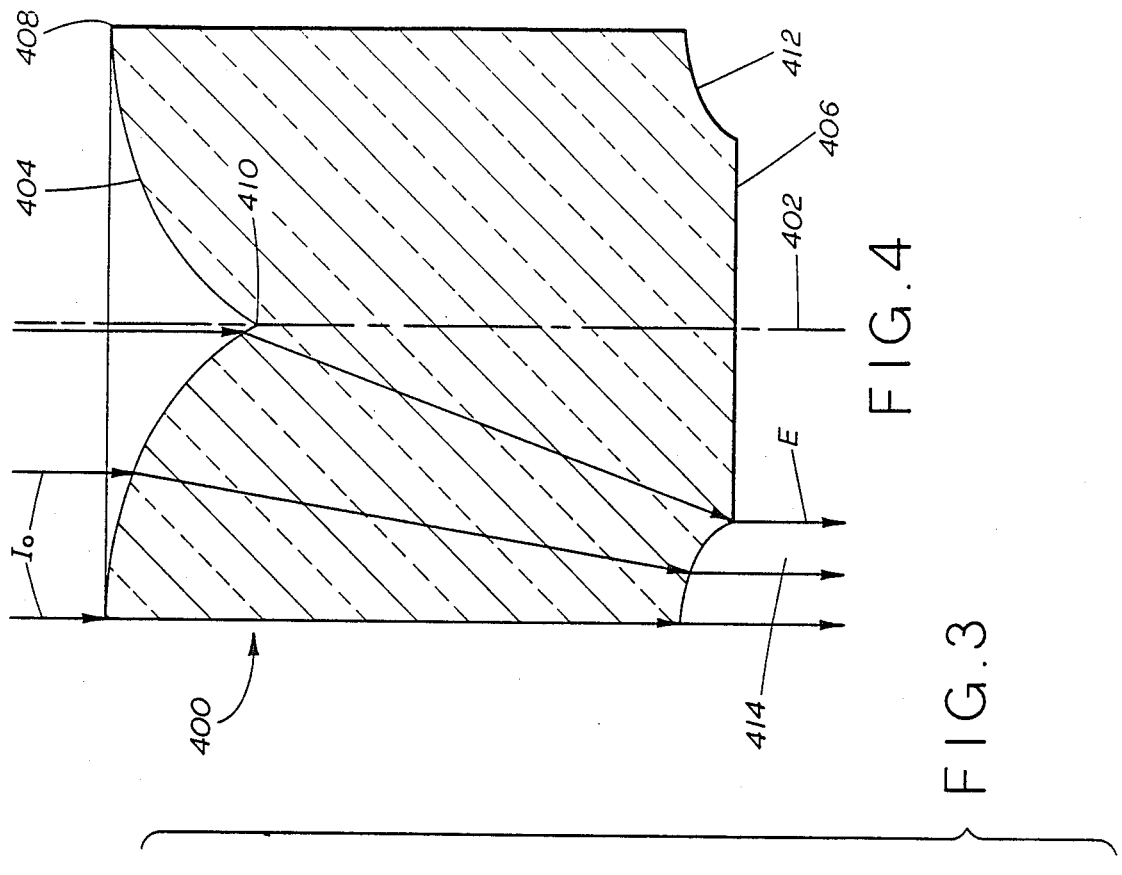
FIG. 4 is a schematic cross-sectional view of a radially symmetric lens producing an annular beam according to the present invention.

Referring to FIG. 4, the radially symmetric cuspate lens 400 has an axis 402, front surface 404, rear surface 406, periphery 408 and cusp 410 essentially as described above with reference to FIG. 3. However, the front surface 404 has a geometry such that the incident light $I_0$ is refracted to an annular section 412 of the rear surface 406. The annular section 412 has a slope geometrically similar to that of the front surface 404 so that the light E is emitted therefrom oriented in the same direction as the incident light $I_0$, i.e. parallel to axis 402. Thus, the lens 400 produces an annular beam 414.

Figure 6A:
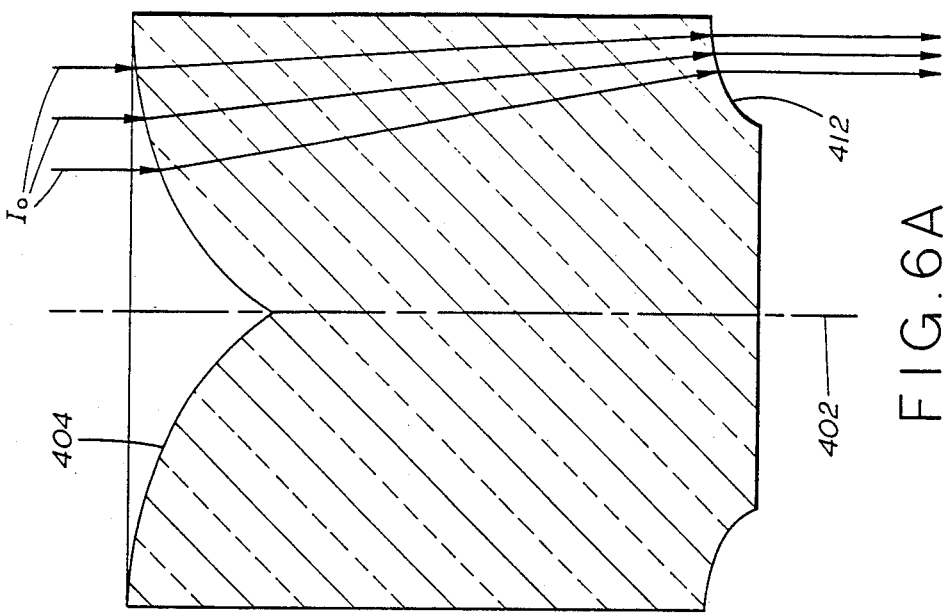
FIGS. 6A and 6B are schematic cross-sectional views of the lens of FIG. 4 illustrating a theoretical model for calculation of the lens surface profiles.
Figure 6B:
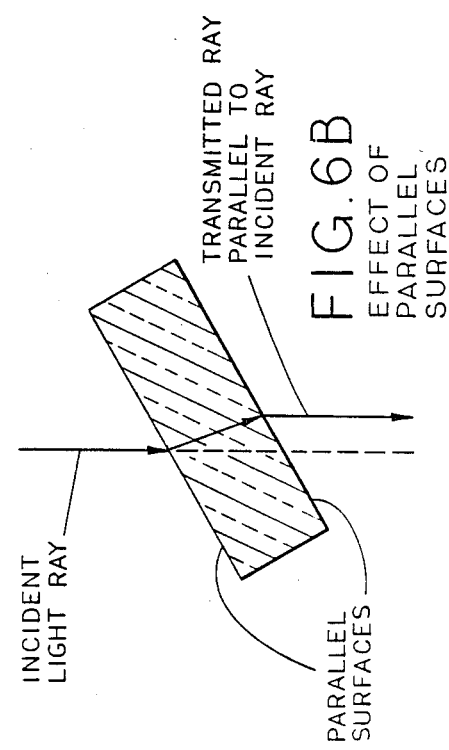

A Fortran computer program based on geometric ray tracing equations as illustrated in FIG. 6 for the radially symmetric cuspate lens 400 of FIG. 4 producing an annular beam is as follows:

```
PROGRAM ANNULAR
REAL T, N, DR, R, W, GAMMA, FR, FPR, TP, RP
REAL FPRL, RPL, TPL, RAD, OCR, OCFR, OCTP, OCRP, OTP
WRITE (6,10)
FORMAT (1X,'RADIUS(mm)=')
READ (5,20) RAD
FORMAT (F15.7)
WRITE (6,11)
FORMAT (1X,'STEPSIZE(sms)=')
READ (5,20) DR
WRITE (6,12)
FORMAT (1X,'THICKNESS OF LENS(mm)=')
READ (5,20) T
WRITE (6,13)
FORMAT (1X,'APPROXIMATE RING THICKNESS(mm)=')
READ (5,20) W
WRITE (6,14)
FORMAT (1X,'n=')
READ (5,20) N
WRITE (6,15)
FORMAT (1X,'ORIGIN CORRECTION (mm)=')
READ (5,20) OTP
R=0
FRP=0
RP=0
RP=0
TP=0
WRITE (6,16)
FORMAT (1X,'(Coordinates of surface profiles referenced to')
WRITE (6,17)
FORMAT (1X, 'an origin on the lens axis at the rear surface.)')
WRITE (6,18)
FORMAT (1X,'')
WRITE (6,19)
FORMAT (1X,'  FRONT SURFACE   SLOPE   REAR SURFACE')
WRITE 6,21
FORMAT (1X,'  r (mm)  f(r) (mm)  r (mm)  g(r)  (mm)')
OCR=R+RAD
OCT=T+OTP
OCRP=RP+RAD
OCTP=TP+OTP
WRITE (6,100) OCR, OCT, FRP, OCRP, OCTP
FORMAT (F13.2,F13.2,F13.2,F13.2,F13.2)
R=−DR
tpl=0
RPL=0
FPRL=0
FR=(((T+W)/2)**2−R**2)**.5+((T−W)/2)
```

-continued

PROGRAM ANNULAR

```
FPR=-R/((((T+W)/2)**2-R**2)**.5)
GAMMA=ATAN(FPR)-ASIN(SIN(ATAN(FPR))/N)
RP=(R+(FR+FPRL*RPL-TPL)*TAN(GAMMA))/(1+FPRL*TAN(GAMMA))
TP=TPL-FPRL*(RPL-RP)
OCR=R+RAD
OCFR=FR+OTP
OCRP=RP+RAD
OCTP=TP+OTP
WRITE (6,100) OCR, OCFR, FPR, OCRP, OCTP
RLP=RP
TPL=TP
FPRL=FPR
R=R-DR
IF (R+RAD) 500,200,200
END
```

Using this PROGRAM ANNULAR, the following data output was generated:
ANNULAR
RADIUS(mm)=20.
STEPSIZE(mm)=0.5
THICKNESS OF LENS(mm)=40.
APPROXIMATE RING THICKNESS(mm)=10.
n=1.49
ORIGIN CORRECTION(mm)=3.00
(Coordinates of surface profile referenced to an origin on the lens surface at the rear axis.)

| FRONT SURFACE | | | REAR SURFACE | |
|---|---|---|---|---|
| r (mm) | f(r) (mm) | SLOPE | r (mm) | g(r) (mm) |
| 20.00 | 43.00 | 0.00 | 20.00 | 3.00 |
| 19.50 | 42.99 | 0.02 | 19.76 | 3.00 |
| 19.00 | 42.98 | 0.04 | 19.53 | 3.00 |
| 18.50 | 42.95 | 0.06 | 19.29 | 2.99 |
| 18.00 | 42.92 | 0.08 | 19.05 | 2.97 |
| 17.97 | 42.87 | 0.10 | 18.82 | 2.95 |
| 17.00 | 42.82 | 0.12 | 18.58 | 2.93 |
| 16.50 | 42.75 | 0.14 | 18.35 | 2.90 |
| 16.00 | 42.68 | 0.16 | 18.12 | 2.87 |
| 15.50 | 42.59 | 0.18 | 17.88 | 2.83 |
| 15.00 | 42.49 | 0.20 | 17.65 | 2.79 |
| 14.50 | 42.39 | 0.23 | 17.42 | 2.74 |
| 14.00 | 42.27 | 0.25 | 17.20 | 2.69 |
| 13.50 | 42.14 | 0.27 | 16.97 | 2.63 |
| 13.00 | 42.00 | 0.29 | 16.75 | 2.57 |
| 12.50 | 41.85 | 0.31 | 16.53 | 2.51 |
| 12.00 | 41.69 | 0.34 | 16.31 | 2.44 |
| 11.50 | 41.51 | 0.36 | 16.09 | 2.37 |
| 11.00 | 41.32 | 0.39 | 15.87 | 2.29 |
| 10.50 | 41.12 | 0.41 | 15.66 | 2.21 |
| 10.00 | 40.91 | 0.44 | 15.46 | 2.12 |
| 9.50 | 40.69 | 0.46 | 15.25 | 2.03 |
| 9.00 | 40.45 | 0.49 | 15.05 | 1.94 |
| 8.50 | 40.20 | 0.52 | 14.85 | 1.84 |
| 8.00 | 39.93 | 0.55 | 14.66 | 1.74 |
| 7.50 | 39.65 | 0.58 | 14.47 | 1.64 |
| 7.00 | 39.35 | 0.61 | 14.29 | 1.53 |
| 6.50 | 39.04 | 0.64 | 14.11 | 1.43 |
| 6.00 | 38.71 | 0.68 | 13.94 | 1.31 |
| 5.50 | 38.37 | 0.71 | 13.77 | 1.20 |
| 5.00 | 38.00 | 0.75 | 13.61 | 1.09 |
| 4.50 | 37.62 | 0.79 | 13.45 | 0.97 |
| 4.00 | 37.21 | 0.83 | 13.30 | 0.85 |
| 3.50 | 36.78 | 0.88 | 13.16 | 0.74 |
| 3.00 | 36.33 | 0.93 | 13.03 | 0.62 |
| 2.50 | 35.85 | 0.98 | 12.91 | 0.51 |
| 2.00 | 35.35 | 1.04 | 12.79 | 0.39 |
| 1.50 | 34.82 | 1.10 | 12.69 | 0.28 |
| 1.00 | 34.25 | 1.17 | 12.59 | 0.18 |
| 0.50 | 33.64 | 1.25 | 12.51 | 0.08 |
| 0.00 | 33.00 | 1.33 | 12.44 | 0.00 |

A cuspate lens producing an annular beam is fabricated by machining a polymethacrylate block to conform to this profile. The resulting lens has a radius of 20 mm, a thickness of 40 mm and produces an annular beam with an inside radius of about 12.4 mm and an outside radius of 20 mm.

The refractive device of the present invention has many contemplated utilities, such as, in decorative indoor lighting in which the cuspate lens is used as a transmissive surface for natural and artificial light sources. The cuspate lens is also contemplated as being useful in laser cutting and laser surgery in which the cutting line is in the form of a circle, ellipse, straight line or the like. Use of a cuspate lens for focusing the laser source into a ring at a focal plane obviates the necessity of moving either the laser source or the object being cut and facilitates an essentially instantaneous laser cut. The cuspate lens is also useful in a fiber optic coupler and in an optical slip ring.

Referring now to FIGS. 7 and 8, there is seen a fiber optic coupler 500 employing a cuspate lens 502. The coupler 500 has a housing 504 with a first fiber optic receiving end 506 and a second fiber optic receiving end 508. A source fiber optic 510 is received along a central longitudinal axis 512 in a conventional fiber optic receiver 514. A beam spreader 516 is positioned to spread light emitted by the fiber optic 510 into a parallel oriented beam of generally circular cross-section. As shown, the beam spreader 516 comprises first biconvex lens 518 and second biconvex lens 520 coaxially positioned in spaced relation thereto. Alternatively, the beam spreader 516 could be a rod device with a refractive index gradient such as that available from Melles Griot. The lens 502 is disposed in the device 500 to receive a beam of light from the beam spreader 516 at the cuspate surface 522 such that the beam is coaxial with a central longitudinal axis 524 of the lens 502. The lens 502 is designed to focus light into a ring or annulus 525 on second fiber optic receiving end 508 in which a plurality of second fiber optics 526 are received.

In operation, the fiber optic coupler 500 receives an optical signal via the fiber optic 510 which is enlarged in the beam spreader 516. The beam from the beam spreader 516 is received by the cuspate lens 502 and focused to the ring 525 where the light is received by each of the optical fibers 526 and transmitted thereby. In this manner, each fiber 526 receives the same fraction of incident light. Conversely, light signals can be transmitted from the fibers 526 to the fiber 510 via the same mechanism.

It is important that each of the transmissive ends of the optical fibers 510 and 526 be cut at a right angle as is well known in the art. However, any number of the second optical fibers can be employed, up to the number which the endplate 508 is designed to receive. The optical fibers 510 and 526 can be readily removed and/or inserted in the respective receiving ends 506 and 508 since they are mechanically attached rather than welded.

If desired, the device 500 can also be used as an optic slip ring by, for example, permitting the end 508 to rotate with respect to the housing 504. In this embodiment, the end 508 is positioned on a stationary platform and the housing 504 on a platform rotating with respect thereto about the axes 512 and 524, or vice versa.

Referring now to FIG. 9, there is seen a two-channel optic slip ring 600 employing cuspate lenses 602 and 604. The slip ring 600 has a first housing 608 positioned on a rotating platform (not shown) rotating around an axis 610, and a second housing 612 positioned on a stationary or rotating platform (not shown) such that the housings 608 and 612 rotate with respect to each other. In a first channel 614, a fiber optic 616 is positioned to transmit light to and/or receive light from a beam spreader 618 coaxial with the axis 610. A corresponding coaxial beam spreader 620 is positioned to receive light emitted from and/or transmit light to beam spreader 618, and which is transmissively connected to optical fiber 621. The beam spreaders 618 and 620 are, for example, rod lenses with a graded index of refraction such as those available from Melles Griot.

A second channel is provided in the first housing including optical fiber 622, beam spreader 624 and cuspate lens 602 coaxially aligned to send and/or receive light in an annulus 626 around the beam spreader 618. The corresponding second channel in the second housing 612 is similarly provided with cuspate lens 604, beam spreader 628 and optical fiber 630. If desired, additional channels can be provided by using cuspate lenses which are progressively larger in diameter. Light losses resulting from the fiber optic(s) passing from outside the housings through the transmission annulus of the second channel (and any additional channels) are minimal.

The foregoing description is illustrative only, and various changes from the exemplary embodiments will occur to those in the art. It is intended that all such variations within the scope and spirit of the appended claims be embraced thereby.

We claim:

1. A refractive device for transmitting radiation in a selected geometric pattern, comprising:
   a central longitudinal axis and a periphery in spaced relation thereto;
   a front surface extending laterally from said axis to said periphery for receiving radiation oriented parallel with respect to said axis, said front surface having a cusp at least at said axis, a maximum slope magnitude within said periphery and spaced therefrom, and a decreasing slope magnitude in a direction from said cusp toward said periphery for refracting all of said radiation away from said axis; and
   a rear surface having at least one annular section sloped oblique to said axis for transmitting all of said refracted radiation from said device in an annular pattern.

2. The device of claim 1, wherein said maximum slope magnitude is adjacent said cusp.

3. The device of claim 1, wherein said maximum slope magnitude is essentially at said cusp.

4. The device of claim 1, wherein said slope decreases from said maximum over essentially the entire distance to said periphery.

5. The device of claim 1, wherein said front surface is radially symmetric with respect to said axis.

6. The device of claim 5, wherein said front surface has a geometry to focus said radiation in a ring at a focal plane.

7. The device of claim 5, wherein said front surface refracts said radiation to said annular section of said rear surface and said annular section has a geometry for transmitting said refracted radiation oriented parallel to said axis into an annular beam.

8. The device of claim 7, wherein said annular section lies within an area bounded within said periphery.

9. The device of claim 7, wherein each ray of said radiation is refracted at an entry point on said front surface to a transmission point of said annular section having the same slope as said entry point.

10. The device of claim 1, wherein said front surface is cuspated along a portion of a plane containing said axis and said front surface is symmetric with respect to said plane.

11. The device of claim 1, wherein substantially all of said radiation received by said front surface is transmitted through said rear surface.

12. The device of claim 1, wherein said device is made of a material transmissive to a form of radiation selected from the group consisting of: gamma rays, X-rays, ultraviolet rays, visible light rays, infrared, microwaves, radio waves, and sound and ultrasound waves.

13. A lens for producing an annular beam of parallel radiation, comprising:
   a central longitudinal axis and a periphery in spaced relation thereto;
   a front surface extending laterally from said axis to said periphery for receiving radiation oriented parallel with respect to said axis; and
   a rear surface with an annular section for transmitting radiation from the lens;
   said front surface having a cusp at said axis, a maximum slope magnitude at said cusp, and a slope magnitude decreasing from said cusp to said periphery for refracting each ray of said radiation from an entry point of said front surface to a point of said annular section of said rear surface having a slope the same as that of said entry point, to transmit said radiation into an annular beam parallel with respect to said axis.

14. A lens made of a transmissive material for conservatively focusing radiation at a focal plane into a ring around a central area from which the radiation is excluded, comprising:
   a central longitudinal axis and a periphery in spaced relation thereto;
   a front surface extending laterally from said axis to said periphery for receiving radiation oriented parallel with respect to said axis, said front surface being radially symmetrical with respect to said axis and having a cusp and maximum slope magnitude at said axis, and a slope magnitude decreasing from said cusp to a minimum at said periphery for refracting said radiation away from said axis; and
   a rear surface normal to said axis for transmitting said refracted radiation from the lens;
   said front surface having a functional profile essentially according to the equation:

$$f(r) = [OPL - t - D[\cot]\sec\xi]/[n[\cot]\sec\gamma - 1],$$

wherein f(r) is the functional form of said front surface, r is the radial distance from said axis, t is the thickness of the lens from said rear surface to said front surface at said periphery, D is the focal distance from said rear surface to the focal plane, n is the refractive index of the lens, $\gamma$ is an angle according to the equation:

$$\gamma = \tan^{-1}[f'(r)] - \sin^{-1}\{[\sin(\tan^{-1}[f'(r)])]/n\},$$

wherein f'(r) is the first derivative of f(r) with respect to r, $\xi$ is an angle according to the equation:

$$\xi = \sin^{-1}(n \sin \gamma),$$

and OPL is the optical path length according to the equation:

$$OPL = [t f(r)] + n[f(r)/[\tan]\cos\gamma] + [D/[\tan]\cos 1\xi].$$

* * * * *